United States Patent
Hellmann et al.

(10) Patent No.: US 8,447,488 B2
(45) Date of Patent: May 21, 2013

(54) DEVICE FOR LONGITUDINALLY GUIDING A MOTOR VEHICLE

(75) Inventors: Manfred Hellmann, Hardthof (DE); Markus Hagemann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 712 days.

(21) Appl. No.: 11/989,921

(22) PCT Filed: Aug. 10, 2006

(86) PCT No.: PCT/EP2006/065234
§ 371 (c)(1),
(2), (4) Date: Apr. 9, 2010

(87) PCT Pub. No.: WO2007/033867
PCT Pub. Date: Mar. 29, 2007

(65) Prior Publication Data
US 2010/0191436 A1    Jul. 29, 2010

(30) Foreign Application Priority Data

Sep. 21, 2005   (DE) .......................... 10 2005 045 018

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| G06F 7/70 | (2006.01) |
| G06F 19/00 | (2011.01) |

(52) U.S. Cl.
USPC ................................ 701/96; 701/70; 701/93

(58) Field of Classification Search
None
See application file for complete search history.

(56) References Cited

U.S. PATENT DOCUMENTS

| | | | |
|---|---|---|---|
| 6,188,949 B1 | 2/2001 | Hahn et al. | |
| 7,085,637 B2 * | 8/2006 | Breed et al. ...................... | 701/38 |
| 7,542,839 B2 * | 6/2009 | Wagner et al. ................... | 701/93 |

FOREIGN PATENT DOCUMENTS

| | | |
|---|---|---|
| DE | 19821803 | 11/1999 |
| DE | 19931161 | 1/2001 |
| EP | 0956993 | 11/1999 |
| JP | 7-182598 | 7/1995 |
| JP | 8-263791 | 10/1996 |
| JP | 11-115545 | 4/1999 |
| JP | 2004-86450 | 3/2004 |
| JP | 2004086450 A * | 3/2004 |

OTHER PUBLICATIONS

International Search Report, PCT International Patent Application No. PCT/EP2006/065234, dated Nov. 10, 2006.

* cited by examiner

*Primary Examiner* — Paul Danneman
(74) *Attorney, Agent, or Firm* — Kenyon & Kenyon LLP

(57) ABSTRACT

A device is described for longitudinally guiding a motor vehicle, including a sensor system for locating preceding vehicles, a controller that regulates the speed of the vehicle to a setpoint speed, either in a following driving mode as a function of the distance from a preceding vehicle or in a free driving mode, an interface to a navigation system which provides information about the traveled route, and a limiting device for limiting the setpoint speed based on the provided information. The limiting device is designed for calculating a limiting value for the setpoint speed for each possible route when the travel route is recognized as being ambiguous and for selecting the greatest of these limiting values for limiting the setpoint speed.

12 Claims, 3 Drawing Sheets

DEVICE FOR LONGITUDINALLY GUIDING A MOTOR VEHICLE

FIELD OF THE INVENTION

The present invention relates to a device for longitudinally guiding a motor vehicle, including a sensor system for locating preceding vehicles, a controller that regulates the speed of the vehicle to a setpoint speed, either in a following driving mode as a function of the distance from a preceding vehicle or in a free driving mode, as well as an interface to a navigation system that provides information concerning the route traveled, and a limiting device for limiting the setpoint speed based on the information provided.

BACKGROUND INFORMATION

Such devices for longitudinally guiding a motor vehicle are also known as ACC (adaptive cruise control) systems and typically have a radar sensor as a sensor system which can be used to measure the distances and relative speeds of preceding vehicles. This method makes it possible to follow a vehicle traveling directly ahead, the so-called target object, at a suitable distance or, more precisely, in a suitably selected time interval. In free driving mode when no target object is present, the speed is regulated to a setpoint speed, which in the systems in use today is specified by a desired speed selected by the driver.

In specific conditions, for example when driving through tight curves, it is possible that desired speed may not be adapted to the current situation so that the curve is taken at an excessively high speed. The driver is then forced to intervene in the longitudinal guidance and temporarily deactivate the ACC system.

In German Patent Application Nos. DE 198 21 803 A1 and DE 199 31 161 A1, longitudinal guidance systems are described having a connection to a navigation system which is also present in the vehicle so that the route information supplied by the navigation system, in particular the information readable from a digital map concerning the curvature of the section of roadway directly ahead, may be included in the speed regulation. However, there is the problem that at intersections or forks in the road in the complex road network it is not always clear a priori which route the host vehicle will take. The route information provided by the navigation system may be used in longitudinal guiding only if the guidance function of the navigation system is active, so it may be assumed that the host vehicle will follow the route calculated by the guidance function. However, most trips with a motor vehicle take place in known territory, so that the guidance system is not necessary per se and would only have to be activated for the purpose of longitudinal guidance which involves, however, a relatively cumbersome destination input. Moreover, even when the guidance system is activated, it is relatively frequently the case that the driver deviates from the calculated route because the calculations executed by the navigation system for finding the quickest route to the destination are based on certain assumptions about the speeds possible on highways, country roads, or inner city streets and these assumptions frequently contradict the driver's experience.

SUMMARY

The present invention may make it possible to utilize the functions of the longitudinal guidance system with which an adapted speed is achieved even when the guidance function of the navigation system is not activated.

According to example embodiments of the present invention, this may be achieved in that the limiting device is designed in such a way that, when ambiguity of the driving route is detected, it calculates for each possible route a limiting value for the setpoint speed and selects the greatest of these limiting values for limiting the setpoint speed.

It may be achieved in this way that the limiting device is always in a defined state, even when the likely driving route is not clear, and may therefore also be active when no information is present about the route likely to be selected by the driver. When approaching an intersection or a fork in the road the operating mode of the limiting device is based on the assumption that from the different possible routes the driver will select the one which allows the highest speed. This assumption does not always have to be correct; however, it creates the prerequisite that the limiting device may actually be active when the driving route is unknown and thus enables the speed to be automatically adapted in any event on those road sections where the route is unambiguous. It is deliberately accepted that the driver must occasionally actively intervene in the longitudinal guidance, namely always when from multiple possible routes he selects the one which only allows driving with low speed. In such situations, which will generally occur only sporadically anyway, the driver will reckon, however, that the limiting device is unable to correctly predict the adapted speed and he will therefore be prepared to actively intervene in the longitudinal guidance. The associated adverse effect on the driver's comfort can be accepted with no problem. The advantage prevails that the function of the limiting device is available in all other situations.

Within the scope of the function of the limiting device, it is decided whether the driving route is unambiguous or ambiguous. Different additional criteria may be considered for this decision, in particular the state of the turn signal. In doing so, the frequency of situations in which the driver must eventually intervene in the longitudinal guidance may be considerably reduced. A desired side effect is that the driver is urged in this way to communicate his intention by setting the turn signal (blinker) early.

If needed, steering actions of the driver may also be considered for eliminating ambiguity, e.g., a lane change to a deceleration lane before a highway exit ramp.

If the guidance function in the navigation system is active, the route may be assumed to be unambiguous under the assumption that the driver will follow the calculated route. However, it is also possible in a modified specific embodiment that the route calculated by the guidance function is generally ignored. An unnecessary deceleration of the vehicle is avoided in this case if the driver deviates from the calculated route and, for example, ignores a turn recommendation output by the navigation system. Moreover, this variant has the advantage that the limiting device always has the same operating mode, so that it is easier for the driver to become accustomed to the consistent system behavior.

ACC systems typically have a resume button using which the driver may reactivate the ACC function after a momentary deactivation. The speed which was set last as the desired speed prior to deactivation of the system is normally resumed as the desired speed. If, in the system according to the present invention, the driver actively intervenes in the longitudinal guidance in the event of ambiguity of the route, e.g., by operating buttons or the brake pedal in order to decelerate the vehicle, it points to the fact that the driver has decided to take the route for which a lower limiting value applies to the setpoint speed. In this case it may be appropriate to modify the function of the resume button in such a way that the lower limiting value is used as the basis for the regulation instead of the higher limiting value. After deactivation of the ACC function, the driver may immediately operate the resume button and the system will regulate the speed in such a way that it is adapted to the route selected by the driver.

The limiting device may be activated and deactivated by driver instructions. In a preferred specific embodiment, however, the limiting device is automatically active in the free driving mode and on the other hand automatically inactive in the following driving mode. This operating mode is based on the idea that the host vehicle is able to drive through the section of roadway ahead at the same speed at which the target object drives through this section of roadway. Since, based on the route information provided by the navigation system, the road curvature may only be determined with limited accuracy, the limiting device is programmed in such a way that it takes a certain safety allowance into account when calculating the limiting value for the setpoint speed. However, the safety allowance is not necessary in the following driving mode and one has the advantage that the distance to the target object is kept constant and unnecessary deceleration and acceleration operations, which contradict the driver's intuition and increase fuel consumption, may be avoided. If the target object disappears, for example when the preceding vehicle makes a turn or changes over to an adjacent lane, the system changes into free driving mode and the limiting device becomes automatically active so that travel is continued at an adapted speed.

BRIEF DESCRIPTION OF THE DRAWINGS

Exemplary embodiments of the present invention are depicted in the figures and are explained in greater detail below.

DETAILED DESCRIPTION OF EXAMPLE EMBODIMENTS

Figure 1:
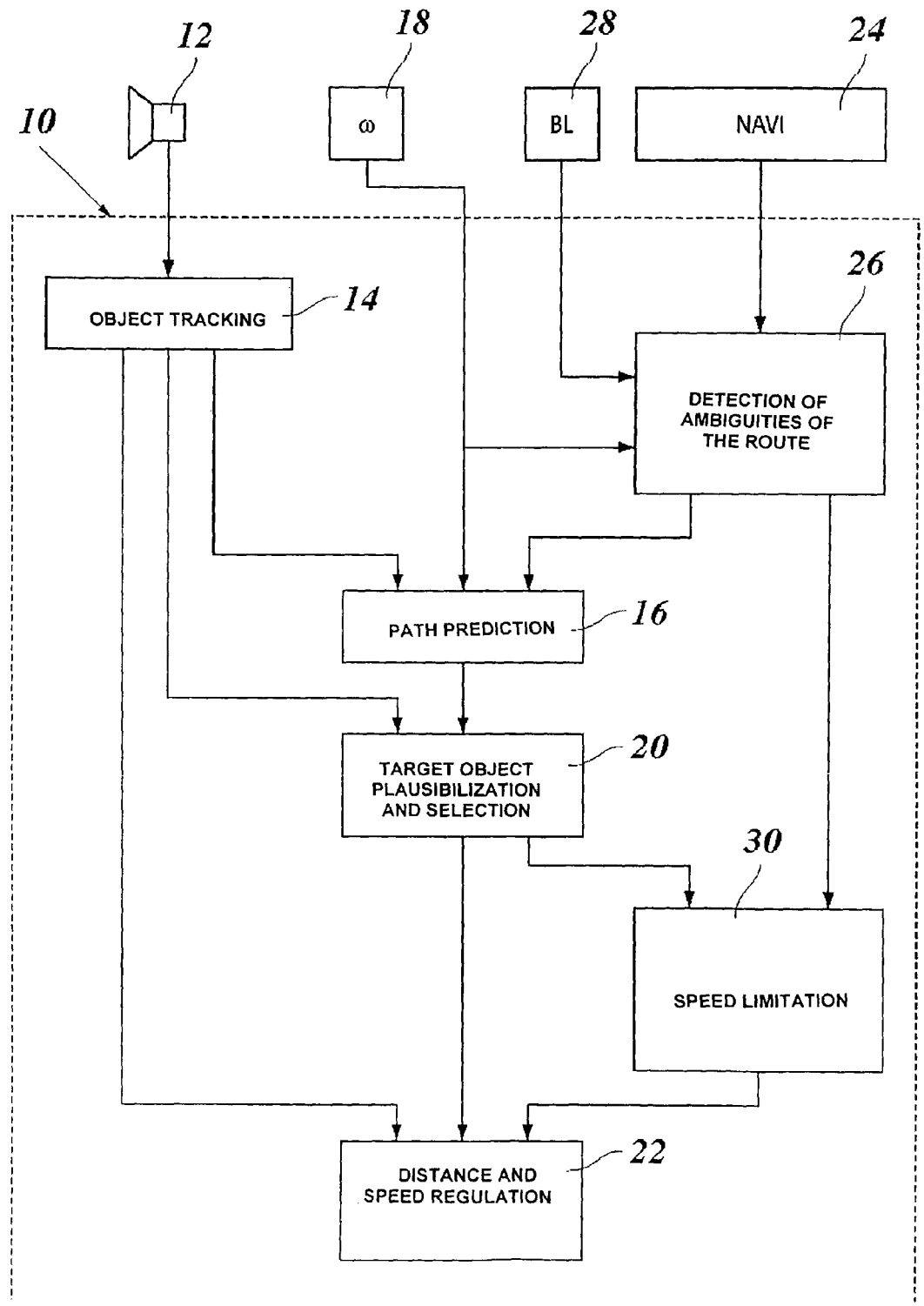
FIG. 1 shows a block diagram of the longitudinal guidance device.

FIG. 1 shows an ACC system 10, the basic design and function of which is presumed to be known and will therefore only be outlined briefly here.

A radar sensor 12 having angle resolution installed in the front of the vehicle supplies ACC system 10 with locating data (distances, relative speeds, and azimuth angles) of the objects located. The measured data are updated cyclically. In a tracking module 14, the prevailing measured data are compared with the measured data from previous measurement cycles, thus making it possible to track the movements of individual objects.

A path prediction module 16 is used to estimate the anticipated path of the host vehicle. Therefore, in the simplest case only yaw rate [ω] of the host vehicle is analyzed, this yaw rate being measured with the help of a yaw rate sensor 18, a determination of road curvature in the section of road on which the host vehicle is driving at the moment being made possible in conjunction with the driving speed of the host vehicle.

In the example shown, data of tracking module 14 are additionally analyzed during path prediction. Radar sensor 12 responds not only to preceding vehicles, but also to stationary objects and oncoming traffic. However, the preceding vehicles may be identified based on the relationship between their relative speed and the driving speed of the host vehicle. If one or multiple preceding vehicles is/are located, an upcoming curve may be recognized by the fact that the preceding vehicles collectively execute a transversal movement even when the host vehicle has not yet driven into the curve and the yaw rate [ω] is thus still virtually equal to zero.

Based on the predicted path, a driving tube is determined within which those vehicles which are considered target objects for the adapted cruise control must be situated. In the simplest case, this driving tube is a strip having a certain standard width which follows the predicted path. Based on the data of tracking module 14 it may also be recognized how many lanes the roadway has on which the host vehicle is traveling and on which of the lanes the host vehicle is located. For this purpose, it may be checked whether there are preceding vehicles present which have a transverse offset to the host vehicle over a longer period of time, the transverse offset approximately corresponding to the normal lane width. It may also be evaluated how often the host vehicle has been passed or how often, on its part, it has passed vehicles traveling on the right-hand adjacent lane.

A plausibility check is then performed on the objects located and tracked in tracking module 14 in a plausibility check module 20, i.e., a probability of an object being inside the driving tube is calculated for each object. This takes into account the fact that the locating data, in particular the transverse position data, have certain error tolerances that increase with an increase in object distance. If the probability that the object is within the driving tube is above a certain threshold, the object is "plausibilized," i.e., it is treated like a relevant object that is in one's own lane. Of the objects thereby plausibilized, ultimately the object having the smallest distance is then selected as the target object for the adaptive cruise control.

In a controller 22, the actual adaptive cruise control is then performed on the basis of the locating data on the target object by intervening in the drive system and, if necessary, also intervening in the brake system of the vehicle, so that the target object is tracked with a time gap that is selectable by the driver within certain limits. If no target object is present, the system is in free driving mode and normally the speed is regulated based on a desired speed selected by the driver.

ACC system 10 described here has an interface to a navigation system 24 of the vehicle. This navigation system contains a road map stored in digital form and ascertains the instantaneous position of the host vehicle with the help of a GPS system (global positioning system), so that information about the road type (highway or rural road) and about exit ramps, intersections, junctions, curves and the like yet to come is also available in the ACC system.

In particular, the curvature of the section of roadway lying directly ahead may be determined from the data stored in the digital map. This information may be used on the one hand to improve the path prediction in prediction module 16. However, in free driving mode in particular, it may also be used to improve the longitudinal guidance of the vehicle. While applying a maximum transverse acceleration, which, depending on the vehicle type, is still experienced as comfortable, the roadway curvature may be used to calculate an upper limiting value for the speed at which the section of roadway in question should be traveled. If this limiting value is lower than the desired speed, it is expedient to modify the speed regulation in such a way that it is based on the limiting value instead of the desired speed.

In addition, the data supplied by the navigation system may also be used to decide if the section of roadway ahead is a highway outside of built-up areas or a street within a city or town so that the applicable legal maximum speed may be selected as a limiting value for the road type in question. The same applies in cases in which an "intelligent" navigation system supplies information concerning speed limits that may exist.

However, if a plurality of possible routes is available ahead of an intersection, a turnoff, or a fork in the road, which is also identifiable from the data of the navigation system, specific assumptions must be made concerning which route the driver is expected to follow so that the system shows defined behavior in every situation. For this reason, the device shown in FIG. 1 has a module 26 which detects such route ambiguities using the data of navigation system 24. In order to eliminate or at least limit such ambiguities, module 26 additionally receives signals from a state sensor 28 which indicates the present state of the turn signal (blinker) of the host vehicle. If, for example, a possibility for turning off to the right exists and the right blinker is set, it may be concluded from this that the driver intends to turn off to the right and consequently the route turning off to the right is significant for determining the limiting value for speed. If, however, neither the right nor the left blinker is set, the situation remains ambiguous since it is not clear if the driver actually intends to drive straight ahead or has only forgotten to set the blinker. It may be possible to eliminate the ambiguity by analyzing the driver's steering behavior. For this purpose, module 26 in the example shown also receives the signal of yaw rate sensor 18.

If the guidance function is active in navigation system 24, in order to eliminate the ambiguity, it may also be assumed that the driver will follow the route calculated by the guidance system. In the example shown here, however, the route information provided by the guidance system will not be considered.

If a target object is selected and followed in a following driving situation, it is a reasonable assumption for the purposes of the adaptive cruise control that the host vehicle will follow the path of the target object. This assumption is based on the path prediction in prediction module 16.

In free driving mode, the aforementioned speed limiting value is calculated in a limiting device 30 which receives from module 26 the roadway data of all possible routes still remaining after the most extensive elimination of ambiguity. In addition, limiting device 30 receives from plausibility check module 20 the information as to whether a target object has been selected or not. If a target object is selected, i.e., in following driving mode, limiting device 30 remains inactive and the adaptive cruise control based on the target object occurs in controller 22 independently of the data supplied by navigation system 24.

In free driving mode, limiting device 30 calculates a separate limiting value for each of the possible routes, each based on the roadway curvature applicable to the route in question. Limiting device 30 then selects the highest of the limiting values calculated in this manner and compares it with the desired speed selected by the driver. The lower of the two values compared with one another is then transferred to controller 22 as the setpoint speed.

Figure 2:
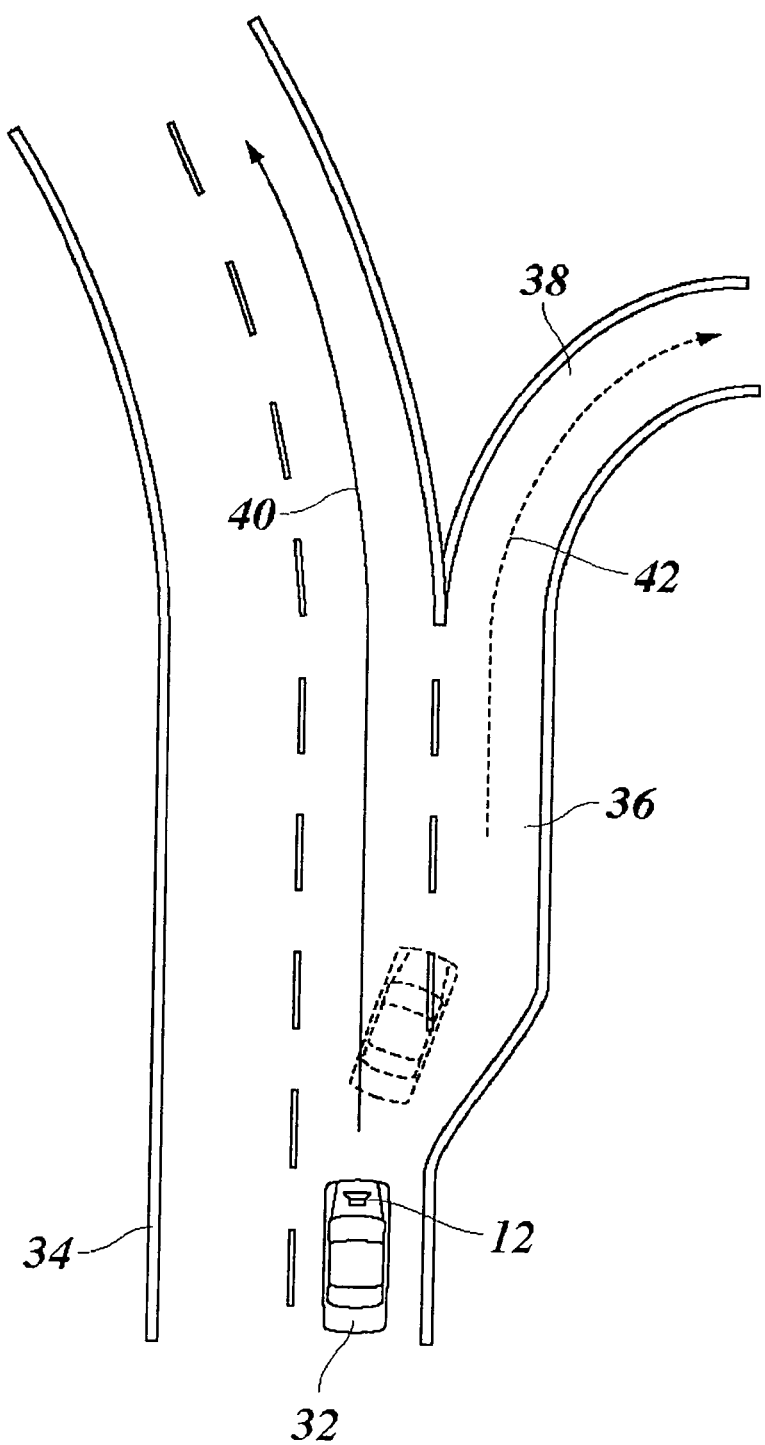
FIG. 2 shows a sketch of a traffic situation for illustrating the mode of operation of the device.

FIG. 2 illustrates the mode of operation of the device described above based on an example.

A vehicle 32, which is equipped with the device according to FIG. 1, travels on the right lane of a two-lane roadway 34, e.g., a directional roadway of a four-lane highway, and approaches an exit having a deceleration lane 36 which merges into a turn-off lane 38 bending relatively sharply to the right, while roadway 34 makes a slight left curve after the exit. Two possible routes 40 and 42, which differ in the roadway curvature, are thus available for vehicle 32. Each of the two curvatures defines a limiting speed value which should not be exceeded if vehicle 32 travels this route and the transverse acceleration of the vehicle is to remain below the upper limit acceptable under comfort and safety considerations.

Module 26 (FIG. 1) recognizes the ambiguity of the situation and signals the curvatures belonging to both routes 40 and 42 to limiting device 30 which calculates the associated limiting values for the speed and selects the greater of those limiting values as the one belonging to route 40. It is initially assumed that the turn signal of vehicle 32 is not set. Additionally, it is assumed that the instantaneous speed of vehicle 32 is higher than the selected limiting value which, since a free driving situation prevails, corresponds to the desired speed selected by the driver. Therefore, this limiting value represents the setpoint speed which is conveyed to controller 22. Controller 22 subsequently calculates a (negative) free driving setpoint acceleration which ensures that the speed of vehicle 32 has decreased to the limiting value when the vehicle travels into the slight left curve.

The approach in practice may be that, based on the roadway curvature, calculation of the limiting value takes place for a specific point which is ahead of the instantaneous position of vehicle 32 by a predefined, preferably speed-dependent distance. This distance is selected in such a way that the necessary deceleration of vehicle 32 may remain in the comfortable range. In a refined specific embodiment, it is also possible that the limiting device calculates multiple limiting values for multiple points along route 40 and conveys these limiting values together with the distances between the respective points to controller 22, so that the controller is able to calculate an optimum deceleration strategy based on these data.

If, in the situation shown in FIG. 2, the right blinker is set in vehicle 32, module 26 recognizes that the travel route is unambiguous and limiting device 30 conveys the appropriate limiting value or limiting values for route 42 to controller 22 having the result that vehicle 32 is decelerated more intensely before it enters turn-off lane 38.

If the driver has not set the turn signal but wants to turn off anyway, it may possibly be recognized at a somewhat later point in time based on the steering movements that the vehicle changes onto deceleration lane 36 as is indicated in FIG. 2 by a dashed line. Information about the presence and the beginning of deceleration lane 36 available in the navigation system is possibly used and possibly, also the information about on which lane vehicle 32 travels, available in the ACC system. This prevents a lane change of the vehicle from the left lane onto the right lane of roadway 34 from being erroneously interpreted as a turn-off intention.

If the driver of vehicle 32 wants to turn off according to route 42 and this turn-off intention is not recognized or recognized too late, the driver must intervene himself in the longitudinal guidance in order to sufficiently decelerate the vehicle. The associated adverse effect on the comfort is substantially smaller than the adverse effect which would occur in the converse case when limiting device 30 would select the lower limiting value (according to route 42) in an ambiguous situation, while the driver actually wants to follow route 40 which allows a higher speed. The relatively strong deceleration of the vehicle, adapted to route 42, would then be unnecessary and implausible and would be perceived as distractive and irritating by the driver as well as the following traffic. Due to the fact that, according to the present invention, the greatest limiting value for the speed is always selected, this disadvantage may be avoided.

Figure 3:
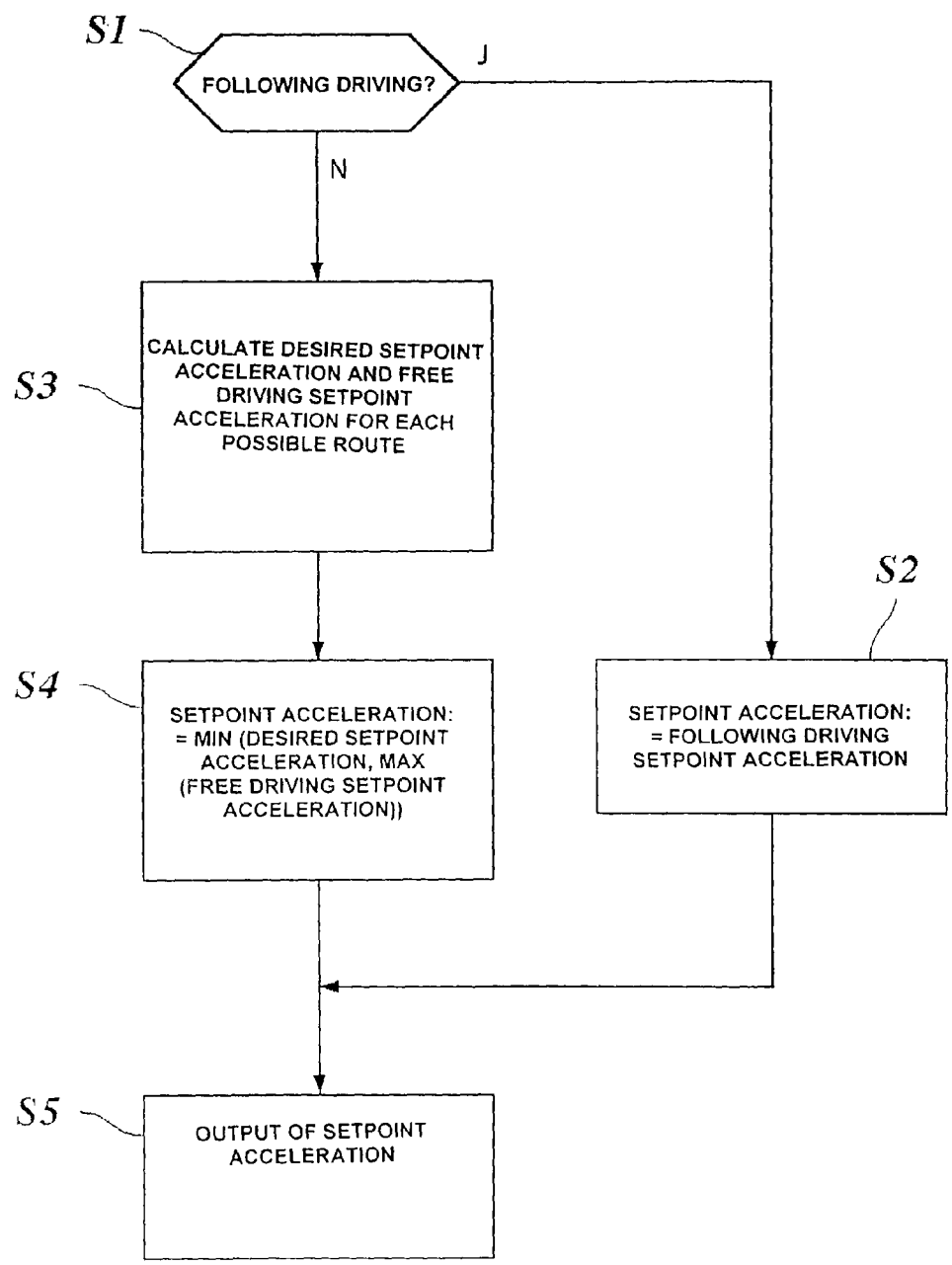
FIG. 3 shows a flow chart for elucidating the mode of operation of the device according to a modified specific embodiment.

FIG. 3 shows a slightly modified operating mode of the device in a flow chart which, however, is in result equivalent to the operating mode described above.

In step S1 it is decided if ACC system 10 is in following driving mode (J) or in free driving mode (N). If the system is in following driving mode, controller 22 calculates a following driving setpoint acceleration as a setpoint acceleration in step S2 using the data concerning the target object supplied by tracking module 14, the following driving setpoint acceleration ensuring that the target object is followed at the predefined time interval.

In free driving mode, however, in step S3, limiting device 30 calculates a desired setpoint acceleration as well as free driving setpoint accelerations for each of the possible routes. The desired setpoint acceleration is the acceleration necessary to maintain or reattain the desired speed selected by the driver. The free driving setpoint accelerations are dependent on the roadway curvature and/or other roadway characteristics of the route in question. In calculating them, limiting device 30 uses roadway data supplied by navigation system 24 for the routes considered possible by module 26. In step S4, limiting device 30 then calculates as a setpoint acceleration the minimum from the desired setpoint acceleration and the maximum of the free driving setpoint accelerations.

In step S5, controller 22 then outputs either the setpoint acceleration calculated in step S2 or the setpoint acceleration calculated in step S4 to the drive and/or brake system of the vehicle.

In contrast to the exemplary embodiment described earlier, this exemplary embodiment does not take into account the setpoint speed but instead the setpoint acceleration. However, in this case also, the free driving setpoint accelerations are calculated in steps S3 in such a way that a limiting value for speed is first determined for each route using the roadway curvature, and the setpoint acceleration is then calculated in such a way that the actual speed on reaching the section of roadway in question corresponds to the limiting value. The limiting values are thus contained implicitly in the free driving setpoint accelerations.

What is claimed is:

1. A device for longitudinally guiding a motor vehicle, comprising:
   a sensor system adapted to locate preceding vehicles;
   a controller adapted to regulate a speed of the vehicle to a setpoint speed, either in a following driving mode as a function of the distance from a preceding vehicle or in a free driving mode;
   an interface to a navigation system adapted to provide information about a traveled route; and
   a limiting device adapted to limit the setpoint speed based on the provided information;
   wherein the limiting device is adapted to calculate a limiting value for the setpoint speed for each possible respective route when a travel route is recognized as being ambiguous, and to select a greatest of the limiting values for limiting the setpoint speed.

2. The device as recited in claim 1, wherein the limiting device is adapted to determine a setpoint speed which is equal to a minimum of a desired speed selected by a driver and the limiting value.

3. The device as recited in claim 1, wherein the limiting values for the setpoint speed are a function of information about roadway curvature on the respective route provided by the navigation system.

4. The device as recited in claim 1, further comprising:
   a module adapted to recognize different route options based on information about a road network provided by the navigation system and to decide which of the different route options are considered as possible routes of the vehicle based on additional information.

5. The device as recited in claim 4, wherein the additional information includes a signal of a state sensor which indicates a state of a turn signal of the vehicle.

6. The device as recited in claim 5, wherein the additional information includes information of a destination guidance system of the navigation system about a calculated travel route.

7. The device as recited in claim 1, wherein the limiting device is active only in free driving mode.

8. The device as recited in claim 7, wherein the limiting device is automatically activatable during a change from the following driving mode into the free driving mode.

9. The device as recited in claim 1, further comprising:
   a module adapted to recognize different route options based on information about a road network provided by the navigation system and to decide which of the different route options are considered as possible routes of the vehicle based on additional information;
   wherein the limiting values for the setpoint speed are a function of information about roadway curvature on the respective route provided by the navigation system.

10. The device as recited in claim 9, wherein the additional information includes a signal of a state sensor which indicates a state of a turn signal of the vehicle, and wherein the additional information includes information of a destination guidance system of the navigation system about a calculated travel route.

11. The device as recited in claim 10, wherein the limiting device is active only in free driving mode, and wherein the limiting device is automatically activatable during a change from the following driving mode into the free driving mode.

12. The device as recited in claim 9, wherein the limiting device is active only in free driving mode, and wherein the limiting device is automatically activatable during a change from the following driving mode into the free driving mode.

* * * * *

UNITED STATES PATENT AND TRADEMARK OFFICE
CERTIFICATE OF CORRECTION

PATENT NO. : 8,447,488 B2
APPLICATION NO. : 11/989921
DATED : May 21, 2013
INVENTOR(S) : Hellmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1462 days.

Signed and Sealed this
Eighth Day of September, 2015

Michelle K. Lee
*Director of the United States Patent and Trademark Office*